United States Patent [19]

Tanaka

[11] Patent Number: 4,930,849
[45] Date of Patent: Jun. 5, 1990

[54] LASER SCANNING APPARATUS AND METHOD OF SCANNING USING SAME

[75] Inventor: Satoru Tanaka, Saitama, Japan

[73] Assignee: Pioneer Electronic Corporation, Tokyo, Japan

[21] Appl. No.: 336,481

[22] Filed: Apr. 12, 1989

[30] Foreign Application Priority Data

Oct. 27, 1988 [JP] Japan .................. 63-271539

[51] Int. Cl.$^5$ .................. G02B 26/10; G02B 6/04
[52] U.S. Cl. .................. 350/6.6; 350/96.24; 250/227.26
[58] Field of Search .................. 350/6.6, 6.91, 96.24, 350/96.25, 96.28, 169, 320; 250/227, 235, 236; 355/71

[56] References Cited

U.S. PATENT DOCUMENTS

| | | | |
|---|---|---|---|
| 3,892,468 | 7/1975 | Duguay | 350/96.24 |
| 3,925,727 | 12/1975 | Duguay | 350/96.24 |
| 4,409,477 | 10/1983 | Carl | 350/96.24 |
| 4,469,941 | 9/1984 | Palmer | 350/96.25 |

*Primary Examiner*—Rodney B. Bovernick
*Assistant Examiner*—Loha Ben
*Attorney, Agent, or Firm*—Finnegan, Henderson, Farabow, Garrett & Dunner

[57] ABSTRACT

A laser scanning apparatus, and related method, comprising a plurality of optical fiber bundle elements each corresponding to a respective one of three primary colors and having an emitting end, each emitting end being disposed at a constant pitch with respect to the other and aligned in a horizontal scanning direction and emitting a light beam of the respective color, an array of light switches disposed adjacent to the emitting ends of the optical fiber bundle elements, each light switch disposed with respect to the other at a pitch equal to the pitch between adjacent emitting ends. Each light switch independently opens or closes in response to information corresponding to a horizontal scanning period of an input video signal corresponding to a video image. A device for polarizing a light beam passing through the array of light switches at each horizontal scanning period and scans the polarized light beam in a vertical scanning direction to project a video image on the screen.

10 Claims, 1 Drawing Sheet

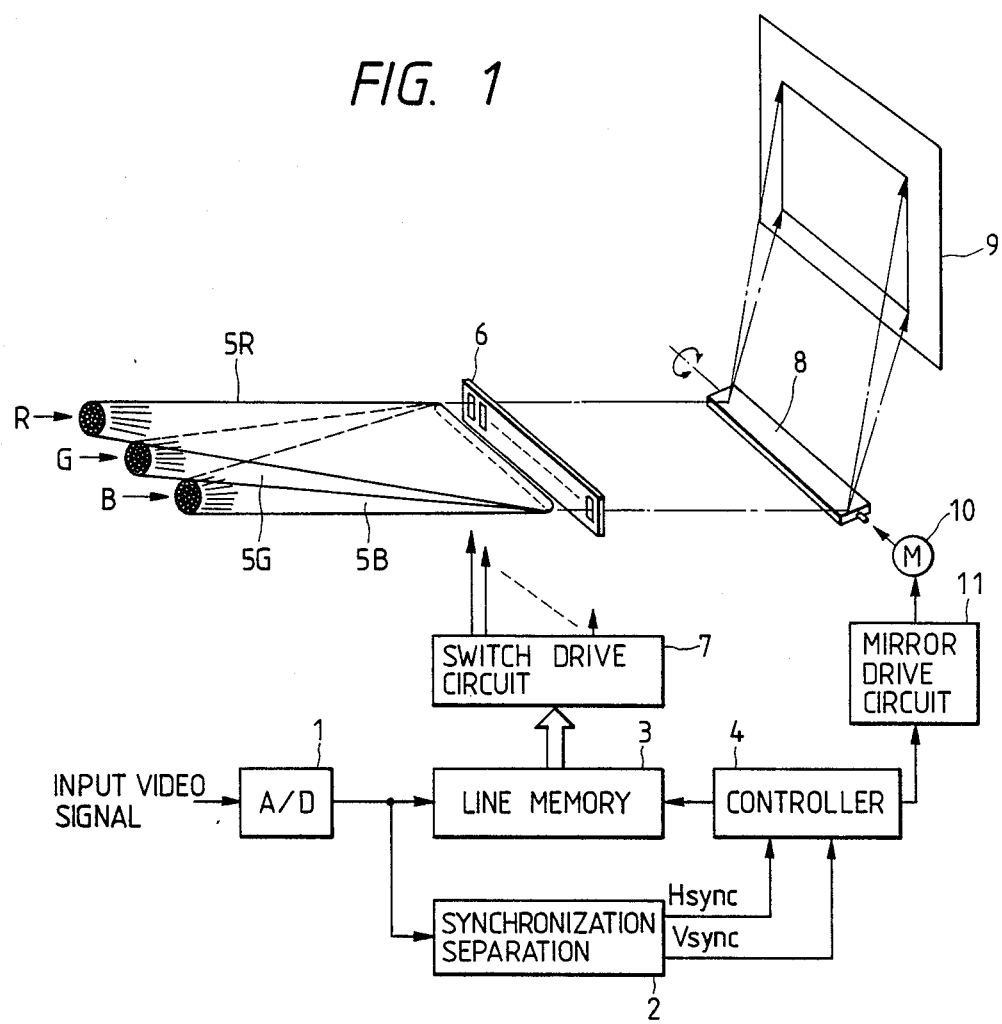

LASER SCANNING APPARATUS AND METHOD OF SCANNING USING SAME

BACKGROUND OF THE INVENTION

1. Field of the Invention

The present invention relates to a laser scanning apparatus and method, and, in particular, to a high speed laser scanning apparatus such as a laser video projector.

2. Description of the Prior Art

A conventional laser scanning apparatus of this type is constructed by combining a polygon rotary mirror rotated at a high speed (e.g., $6 \times 10^4$ rpm) and a polygon rotary mirror rotated at a relatively low speed (e.g., $10^2$ rpm).

Since, in such construction it is necessary to rotate the polygon mirror at a high speed, the mechanical strength of the laser scanning apparatus gets weakened. Further, since it is necessary to use a special type bearing, such as an air bearing of a dynamic pressure type, the cost of manufacturing the apparatus is high, and the apparatus tends to generate a considerable noise. Furthermore, since there is no persistence characteristics of a screen, it tends to generate flicker, unless the light intensity of the light source is increased considerably.

SUMMARY OF THE INVENTION

The object of the present invention is to provide a laser scanning apparatus, which has a reliable mechanical structure and which operates with stability and quietly, and is relatively economical to manufacture.

To achieve the object and in accordance with the purpose of the invention, as embodied and broadly described herein, the present invention comprises a laser scanning apparatus and related method including three optical fiber bundle elements each corresponding to a respective one of three primary colors, i.e., R (red), G (green) and B (blue). Each optical fiber bundle element has an emitting end arranged on at least one straight line in a horizontal scanning direction in that each emitting end is aligned with the other at a constant pitch. An array of spaced light switches is disposed adjacent to the emitting ends of the optical fiber bundle elements. The light switches in the array are disposed at a pitch equal to that between adjacent emitting ends. Each light switch is independently opened or closed. The light switches are opened or closed in response to information corresponding to a horizontal scanning period (1H) of an input video signal, and a light beam passing through respective light switches is polarized at each 1H and the polarized light beam is scanned in a vertical scanning direction at each field of an image corresponding to the input video signal.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 1 is a schematic view of a laser scanning apparatus according to an embodiment of the present invention;

FIG. 2(A) is a view showing the arrangement of the emitting ends of the optical fiber bundle elements according to a first embodiment of the invention; and FIG. 2(B) is a view showing the arrangement of the emitting ends of the optical fiber bundle elements according to a second embodiment of the present invention.

DETAILED DESCRIPTION OF THE PREFERRED EMBODIMENTS

Reference will now be made in detail to the present preferred embodiments of the invention, examples of which are illustrated in the accompanying drawings.

In FIG. 1, an input video signal is digitized by an analog/digital or A/D converter 1, and supplied to a synchronization separating circuit 2 and a line memory 3. Synchronization separating circuit 2 separates and extracts a horizontal synchronization signal Hsync and a vertical synchronization signal Vsync from the input video signal and supplies these synchronization signals to a controller 4. Line memory 3 sequentially stores an image data corresponding to a horizontal scanning period 1H of the input video signal in response to a command signal supplied from controller 4.

Optical fiber bundle elements, 5R, 5G and 5B are disposed to emit respective color lights of R (red), G (green) and B (blue) colors originated from a light source such as a laser diode (not shown). Optical fiber bundle elements, 5R, 5G and 5B are constructed with well known optical fiber bundles. Light incident ends of the optical fiber bundle elements are bundled, and light emitting ends thereof are arranged aligned with one another on at least one straight line in a horizontally scanning direction.

According to a first embodiment of the present invention, as shown in FIG. 2(A), each of the respective emitting ends of optical fiber bundle elements 5R, 5G and 5B is sequentially disposed with the other at a constant pitch and aligned on a single line in a horizontal scanning direction. The constant pitch corresponds to a pitch of picture elements corresponding to the input video signal. A light switch array 6 is disposed in front of the emitting ends of optical fiber bundle elements, 5R, 5G and 5B. The light switch array has a plurality of spaced light switches each spaced at a pitch equal to the constant pitch of the respective emitting ends of the optical fiber bundle elements. A well-known Fabry-Perot resonator, such as an A-O modulator, is used as light switch array 6.

The distance between two light switches each disposed at a respective one of both ends of light switch array 6 corresponds to 1H. A switch drive circuit 7 simultaneously opens or closes each light switch in light switch array 6 in response to the image data stored in line memory 3 corresponding to 1H of the input video signal. Thus, each corresponding picture element is simultaneously turned on or off. However, it is not necessary to simultaneously open or close the light switches.

An image provided by light switch array 6 is reflected by a galvano mirror 8, and enlarged and projected onto a screen 9, through an optical system such as an enlargement projection lens (not shown). Galvano mirror 8 is rotatably disposed substantially perpendicular to the longitudinal direction of light switch array 6, i.e., a vertical scanning direction. A drive source 10 for rotating galvano mirror 8 is driven by a mirror drive circuit 11 by controller 4 whereby galvano mirror 8 is sequentially rotated at a predetermined angle at each 1H, thereby repeatedly moving the beam of light incident thereon in the vertical scanning direction at each field of a corresponding picture to the input video signal. Consequently, a time-scanned image is enlarged and projected on screen 9.

As mentioned above, the image corresponding to 1H of the input video signal is formed on the screen at each 1H, using optical fiber bundle elements 5R, 5G and 5B each corresponding to R, G or B color, and also to a respective light switch of light switch array 6. The image corresponding to 1H of the input video signal is scanned in the vertical scanning direction and then enlarged and projected on screen 9. Accordingly, the scanning is one-dimensional line scanning, performed at a low speed (e.g., 1/30 second for video signals). Consequently, the mechanical structure of the apparatus is reliable and the apparatus operates stably and quietly.

Further, since, unlike the conventional apparatus, it is not necessary to use a special bearing, the apparatus of the present invention may be manufactured economically. Furthermore, since one-dimensional line scanning is performed, flicker is not generated as often as in the conventional apparatus, and the requisite response time of the light switches is substantially less than that of the conventional apparatus. The apparatus of the present invention is also capable of displaying high quality colors, by using a light having an excellent monochromaticity such as a laser beam, as a light source.

In the above-mentioned embodiment, the digitized video signal corresponding to 1H is sequentially stored in line memory 3 and respective light switches of light switch array 6 are opened or closed in response to the stored digitized video signal. However, the respective light switches of light switch array 6 can be constructed to be opened or closed directly in response to the information corresponding to 1H of the digitized video signal, without using line memory 6.

In the first embodiment of the present invention, each emitting end corresponding to a respective one of the three primary colors is aligned on a single line in the horizontally scanning direction and sequentially disposed with respect to the other at a constant pitch. However, in a second embodiment of the present invention, as shown in FIG. 2(B), three straight lines each corresponding to a respective one of the three primary colors and having at least one emitting end corresponding to the respective color aligned thereon are disposed adjacent to and aligned parallel with respect to one another at a constant pitch. Each line corresponding to R, G or B color is synthesized by delaying a corresponding color signal, using line memory 3.

As mentioned above, in the laser scanning apparatus of the present invention, the emitting end of each of the optical fiber bundle elements is arranged at a constant pitch with respect to the other on at least one line in the horizontal scanning direction, and the light switch array is disposed adjacent to the emitting ends of the optical fiber bundle elements. The light switches in the array are arranged at a pitch equal to that of the emitting ends. The light switches are independently opened or closed simultaneously at each horizontal, scanning period in response to the information corresponding to the horizontal scanning of an input video signal, and the light beam passing through the light switches during the horizontal scanning period is polarized in the vertical scanning direction. The laser scanning apparatus of the present invention provides a higher reliable mechanical structure, more stable and quiet operation, and lower manufacturing cost than the conventional laser scanning apparatus.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A laser scanning apparatus, comprising:
    a plurality of optical fiber bundle elements, each corresponding to a respective one of three primary colors and having an emitting end, each emitting end disposed adjacent to the other and aligned on at least one line in a horizontal scanning direction at a first pitch with respect to the other, each emitting end emitting a light beam of the respective color;
    an array of spaced light switches disposed adjacent to the emitting ends of the optical fiber bundle elements, each light switch disposed adjacent to the other and aligned in the longitudinal direction of the array at a second pitch, the second pitch being equal to the first pitch, each light switch being independently opened or closed;
    means for opening or closing each light switch in response to information corresponding to a horizontal scanning period of an input video signal corresponding to a video image; and
    means for polarizing the light beams passing through the array of light switches at each horizontal scanning period and scanning the polarized light beams in a vertical scanning direction for projecting the video image on a screen, the vertical scanning direction being substantially perpendicular to the horizontal scanning direction.

2. The laser scanning apparatus of claim 1, further comprising means for sequentially storing said information corresponding to a horizontal scanning period of an input video signal.

3. The laser scanning apparatus of claim 1, wherein said polarizing means includes a galvano mirror rotatable in the vertical scanning direction.

4. The laser scanning apparatus of claim 1, wherein each of the array of spaced light switches is opened or closed simultaneously during said horizontal scanning period of an input video signal.

5. The laser scanning apparatus of claim 1, wherein said at least one line includes a single line wherein said emitting end corresponding to a respective one of the three primary colors is sequentially disposed with respect to the other on the single line.

6. The laser scanning apparatus of claim 1, wherein said at least one line includes three lines, each line disposed adjacent to the other and aligned parallel to the other, each line corresponding to a respective one of the three primary colors and each having at least one of the emitting ends corresponding to the respective primary color aligned thereon.

7. A method of scanning a video image on a screen, comprising the steps of:
    generating a plurality of light beams, each comprising at least one of three primary colors corresponding to an input video signal corresponding to the video image;
    passing the light beams through an array of light switches, each light switch being disposed adjacent to the other at a constant pitch and aligned in a horizontal scanning direction and independently closed or opened in response to information corresponding to a horizontal scanning period of the input video signal;

polarizing the light beams passing through the array of light switches at each horizontal scanning period; and scanning the polarized light beams in a vertical scanning direction for projecting the video image on a screen, the vertical scanning direction being substantially perpendicular to the horizontal scanning direction.

8. The method of claim 7, further comprising the step of sequentially storing said information corresponding to a horizontal scanning period of an input video signal in storage means.

9. The method of claim 7, wherein the step of polarizing includes rotating a galvano mirror in the vertical scanning direction.

10. The method of claim 7, wherein each of the array of light switches is opened or closed simultaneously during said horizontal scanning period of the input video signal.

* * * * *